UNITED STATES PATENT OFFICE.

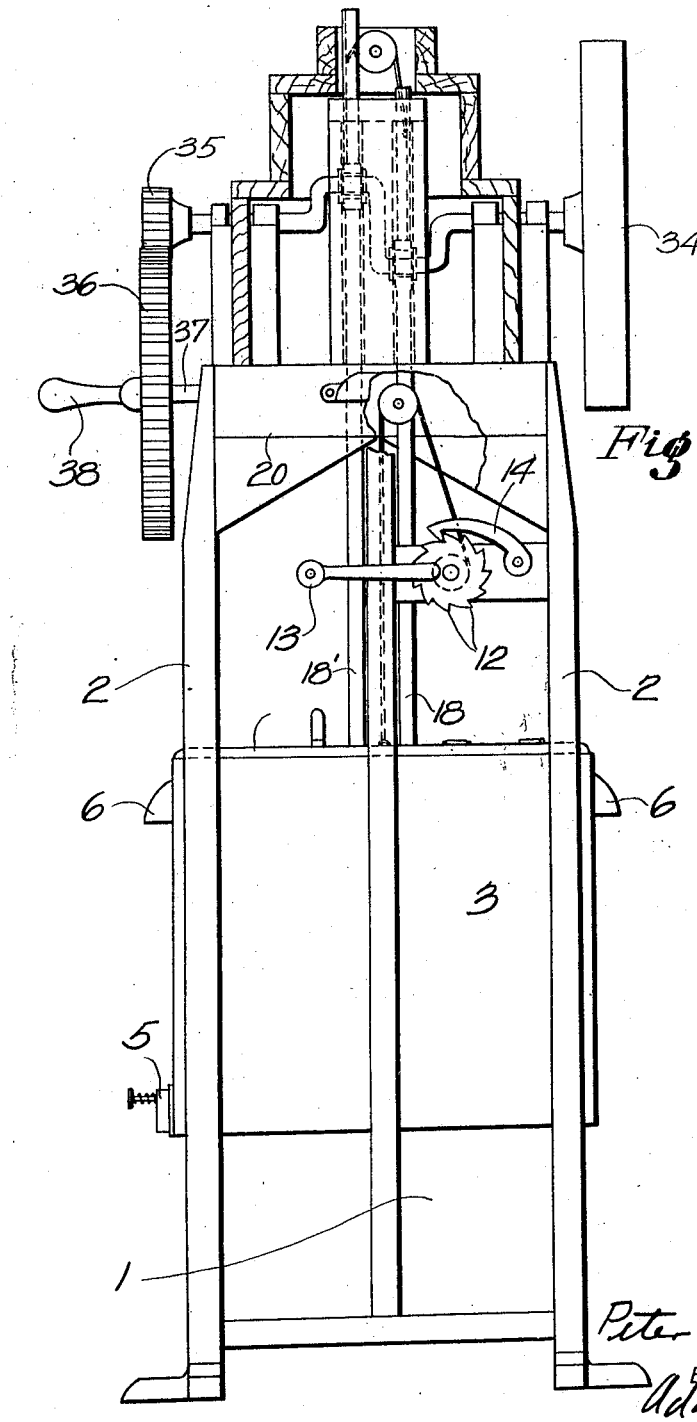

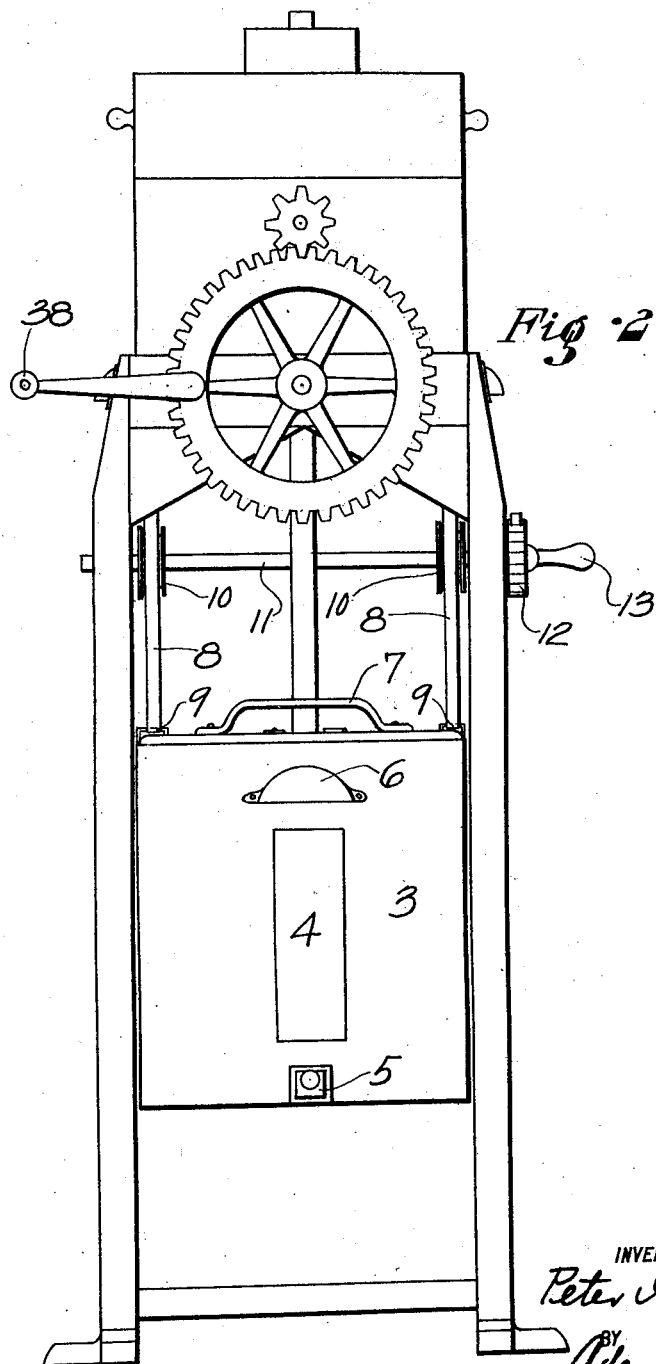

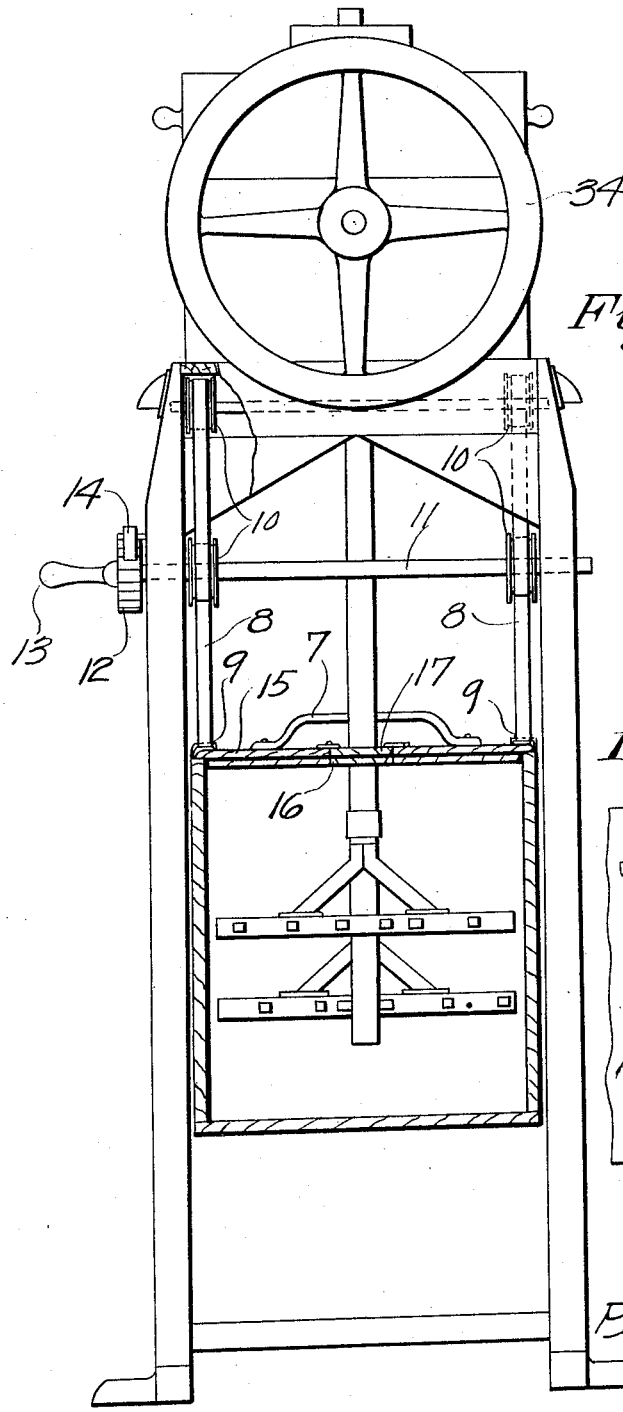
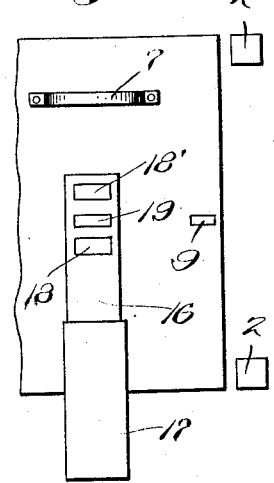

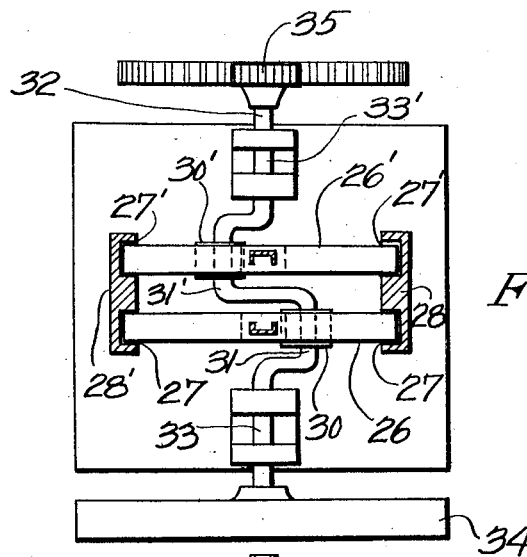
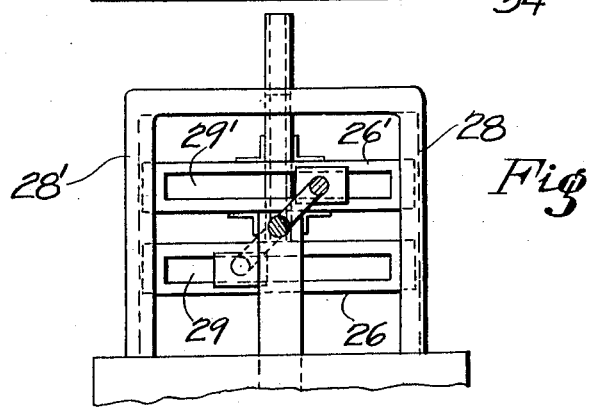
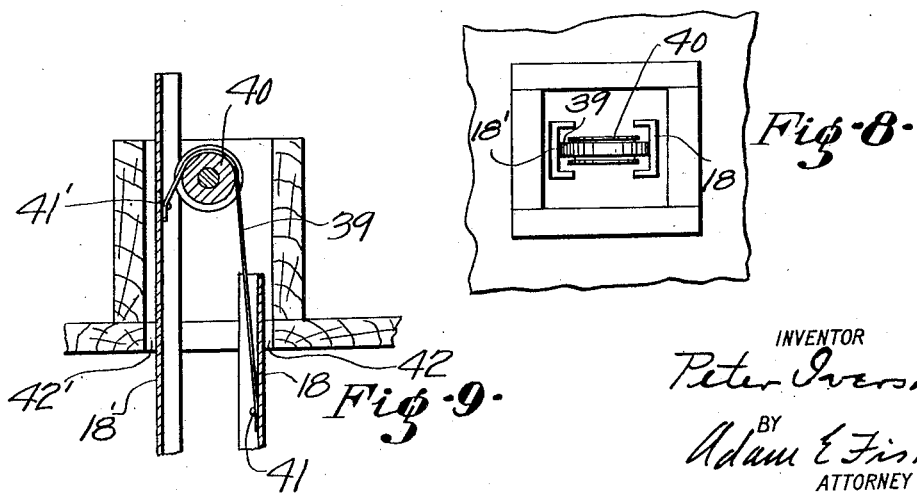

PETER IVERSON, OF KINDRED, NORTH DAKOTA.

DOUBLE-ACTING ADJUSTABLE CHURN.

1,408,511.     Specification of Letters Patent.     Patented Mar. 7, 1922.

Application filed October 18, 1920. Serial No. 417,687.

*To all whom it may concern:*

Be it known that I, PETER IVERSON, a citizen of the United States, residing in the city of Kindred and State of North Dakota, have invented new and useful Improvements in Double-Acting Adjustable Churns, of which the following is a specification, reference being had to the accompanying drawings.

This invention pertains to churns for bringing butter from cream, and the primary object is to provide a churn with a dasher having two sets of interplaying dasher fingers, whereby the butter is developed much quicker.

Another object is to provide a churn with an adjustable container for the cream, so that said container may be raised or lowered relative to the action of the dasher, according as the amount of cream is relatively small or large.

Another object is to provide such churn in a simple, efficient and durable form of construction, best adapted to carry out the purposes intended.

In the drawings:

Figure 1 is a side elevation.

Figure 2 is a front elevation.

Figure 3 is a rear elevation, showing the container in section.

Fig. 6 is a plan view of the crank arms and guide heads at the upper part of the churn;

Fig. 7 is a side view of the parts represented in Fig. 6;

Figures 8 and 9 are top and side views respectively of the pulley and strap supporting mechanism for the dasher rods.

Fig. 10 is a detail of the cover and sliding panel therein enabling the receptacle to be tilted forward, for emptying same.

Figure 4:
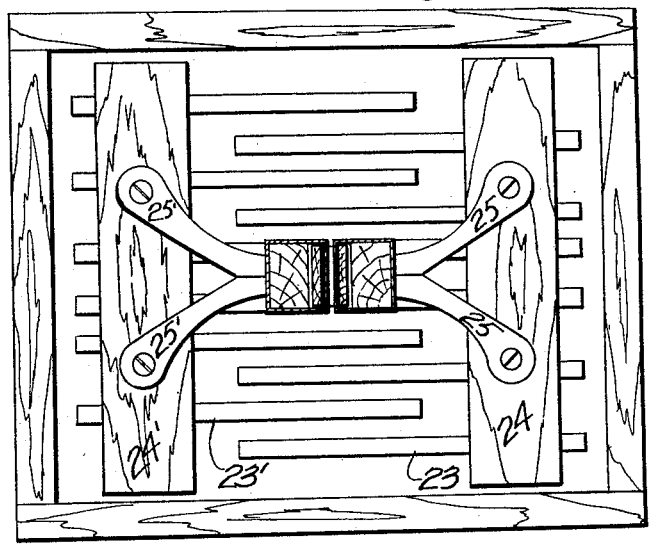
Figure 4 is a plan view of the container and double acting dasher.
Figure 5:
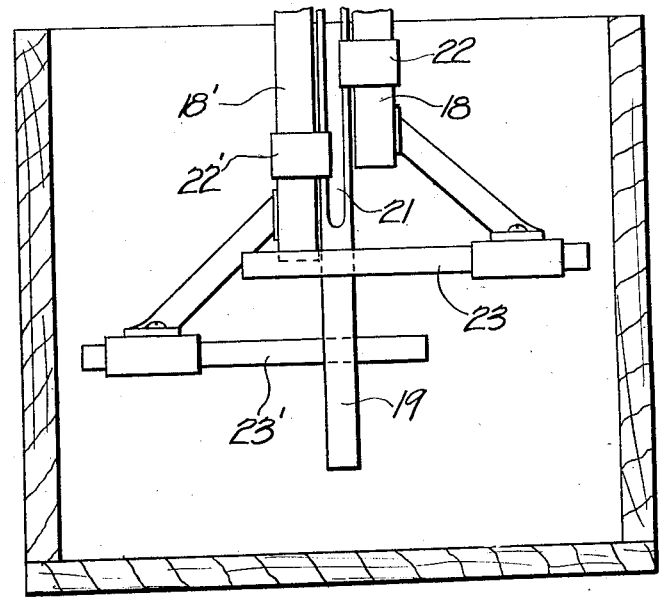
Figure 5 is a detail of two of the dasher fingers and mounting.

The invention consists of a suitable frame 1, within the posts 2 of which is mounted for sliding, vertical adjustment, the cream container 3. This container has a glass frontal panel 4 to show the amount of cream within, a drain trap 5, handles 6, and a cover 15 with handle 7. The vertical adjustment of the container is effected by means of straps 8 attached one to either side of the container at the points 9 and extended up over the pulleys 10. These pulleys are on a shaft 11 journaled across the frame, and having at one extended end the ratchet 12 and crank 13. The ratchet 12 is controlled by the pawl 14. By turning the crank clockwise or the reverse, the container is raised or lowered to adjust the dashers to the amount of cream or milk in the container.

An elongated aperture 16 is cut in the cover 15, from a point slightly in front of the center back toward the rear edge of the cover, and a sliding panel 17 is then fitted in this aperture, said panel being sufficiently shorter than the aperture 16 to leave at the inner end of the panel an opening through the center of the cover to pass the dasher rods 18—18' and the dasher rod guide 19. By this arrangement, by merely drawing the panel 17 back, the container 3 may be readily tilted forwardly for draining through the drain trap 5. This is accomplished by drawing back the panel 17 as shown in Figure 10, and then tilting the receptacle forwardly toward the drain trap 5. In this operation the elongated aperture 16 accommodates the apparent travel of the dasher rods 18—18' as well as the dasher rod guide 19. These rods as a matter of fact all remain stationary and the elongated aperture 16 itself does the traveling, thus permitting the receptacle to be tilted forwardly toward the drain trap 5. In this tilting process the receptacle turns or pivots over the pulleys 10 by means of the straps 8 extended over said pulleys, the straps being attached to the receptacle at the point 9. These elements are plainly shown in Figure 2.

The dasher rod guide 19 is permanently mounted, vertically through the center of the cover 15, the lower end extending within the container 3, while the upper end extends to and is attached in the upper portion 20 of the frame. The lower end of the dasher rod guide carries a slot as shown at 21, and the lower ends of the dasher rods 18—18' are slidingly attached to the guide 19 by means of loops 22—22' joined to the dasher rods and loosely passed through the slot 21.

Two sets of interplaying dashed fingers 23—23' are mounted upon cross-braces 24—24' which are in turn supported from the ends of the dasher rods by means of brackets 25—25'. These dasher fingers are so disposed as to reciprocate between one another in opposite directions, as the churn is operated, thereby quickening the production of the butter.

The dasher-rods 18—18' are extended upwardly from the container 3, and are joined to transverse guide heads 26—26' moving in guide slots 27—27' formed in the posts 28—28'. The guide heads 26—26' carry the slots 29—29' within which are slidingly mounted the crank arm pillows 30—30'. Through these pillows loosely pass the crank arms 31—31' which are oppositely turned upon the crank rod 32 journaled across the top of the frame at the points 33—33'. At the rear end of the crank-rod 32 is mounted the fly-wheel 34 and at the forward end the pinion 35. A drive gear 36 is mounted at the front on a shaft 37 journaled through the frame, and a crank handle 38 is joined to this gear. Thus power is supplied for driving the churn. The dasher rods 18—18' are supported in easy reciprocating position by means of a strap 39, passed over the pulley 40 journaled at the top of the frame and then attached by its ends at the points 41—41' to the upper ends of the dasher rods 18—18', these upper ends being attached to the upper sides of the guide heads 26—26' and extended on up into the guide ways 42—42' of the frame, in order to afford steadiness to the operation of the dasher-rods. This detail of construction is shown in Figures 7, 8, 9. The pulley 40 thus supports the entire weight of the dasher-rods, and renders the operation of the churn easy and effective. The operation of the churn is obvious from the above description.

While I have herein described a certain specific method of constructing and assembling the elements of my invention, it is understood same may be varied in minor details, not departing from the spirit of my invention as defined in the appended claims.

What I claim to be new and patentable is:

1. A churn of the character described, comprising a frame; a cream container mounted in the frame and adapted for vertical adjustment; a dasher-rod guide mounted vertically and extended into the container; two vertical dasher rods slidingly supported by the dasher-rod guide; two sets of interplaying dasher fingers mounted one at the end of each dasher rod; and means for imparting reciprocating motion to said dasher rods.

2. A churn of the character described, comprising a frame; a container mounted therein; a dasher rod guide mounted vertically and extended into the container, said guide being slotted longitudinally at its lower end; two vertical dasher rods slidingly engaged by the slot of said guide; two sets of interplaying dasher fingers mounted, one at the end of each dasher-rod; means for supporting said dasher-rods in position for reciprocating motion; and means for imparting such motion to said rods.

3. A churn of the character described, comprising a frame; a container mounted therein; two reciprocating dasher rods mounted vertically and extended into the container; a pulley in the top of the frame; a strap passed over the pulley and connected at its ends with said dasher rods; dashers at the lower ends of the rods within the container; and means for imparting alternating reciprocating motion to the dasher rods.

4. A churn of the character described, comprising a frame; a container mounted therein; two reciprocating dasher rods mounted vertically and extended into the container; a transverse, slotted guide head near the upper end of each dasher rod; guideways for said guide heads; a crank shaft with two oppositely turned crank arms journaled through said slotted guide heads, with a crank arm slidingly pillowed in each guide head; a pulley in the top of the frame; a strap passed over the pulley and connected at its ends with said dasher rods; interplaying dashers at the lower ends of the rods within the container; and means for rotating said crank shaft and crank arms.

5. A churn of the character described, comprising a frame; a container mounted therein for sliding vertical movement; a crank shaft across the frame over the container; pulleys at the ends of the shaft; straps attached to the sides of the container and engaged by said pulleys; a crank, ratchet and pawl at one end of the shaft as means for raising and lowering the container; a dasher-rod guide mounted vertically and extended into the container, said guide being slotted longitudinally at its lower end; two vertical dasher rods slidingly engaged by the slot of said guide; two sets of interplaying dasher fingers mounted, one at the end of each dasher rod; a transverse, slotted guide head near the upper end of each dasher rod; guideways for said guide heads; a crank shaft with two oppositely turned crank arms journaled through said slotted guide heads, with a crank arm slidingly pillowed in each guide head; a pulley in the top of the frame; a strap passed over the pulley and connected at its ends with the dasher rods; and means for rotating said upper crank shaft and crank arms.

6. In a churn of the character described, and embodying a vertically adjustable and horizontally tiltable container, and dasher rods extending vertically; a cover for the container, said cover being slotted to permit the sidewise tilting of the container; and a sliding panel to close the slot in the cover.

7. In a churn of the character described, and embodying a vertically adjustable container; a crank shaft journaled over the container; pulleys, ratchet and pawl on the shaft; and straps extended from the container to the pulleys, as means for raising or lowering the container.

8. In a churn of the character described, embodying a container and two vertically reciprocating dasher-rods extended upwardly from the container; a transverse, slotted guide head near the upper end of each dasher rod; guideways for said guide heads; a crank shaft with two oppositely turned crank arms journaled through said slotted guide heads, with a crank arm slidingly pillowed in each guide head; a pulley in the top of the frame; a strap passed over the pulley and connected with the dasher rods; and means for rotating said crank shaft and crank arms.

PETER IVERSON.

Witnesses:
S. E. TRUEBLOOD,
MAMIE ROGNE.